July 21, 1964
F. J. BENEDETTO
3,141,192
MOLDING APPARATUS
Filed Dec. 19, 1961
6 Sheets-Sheet 1
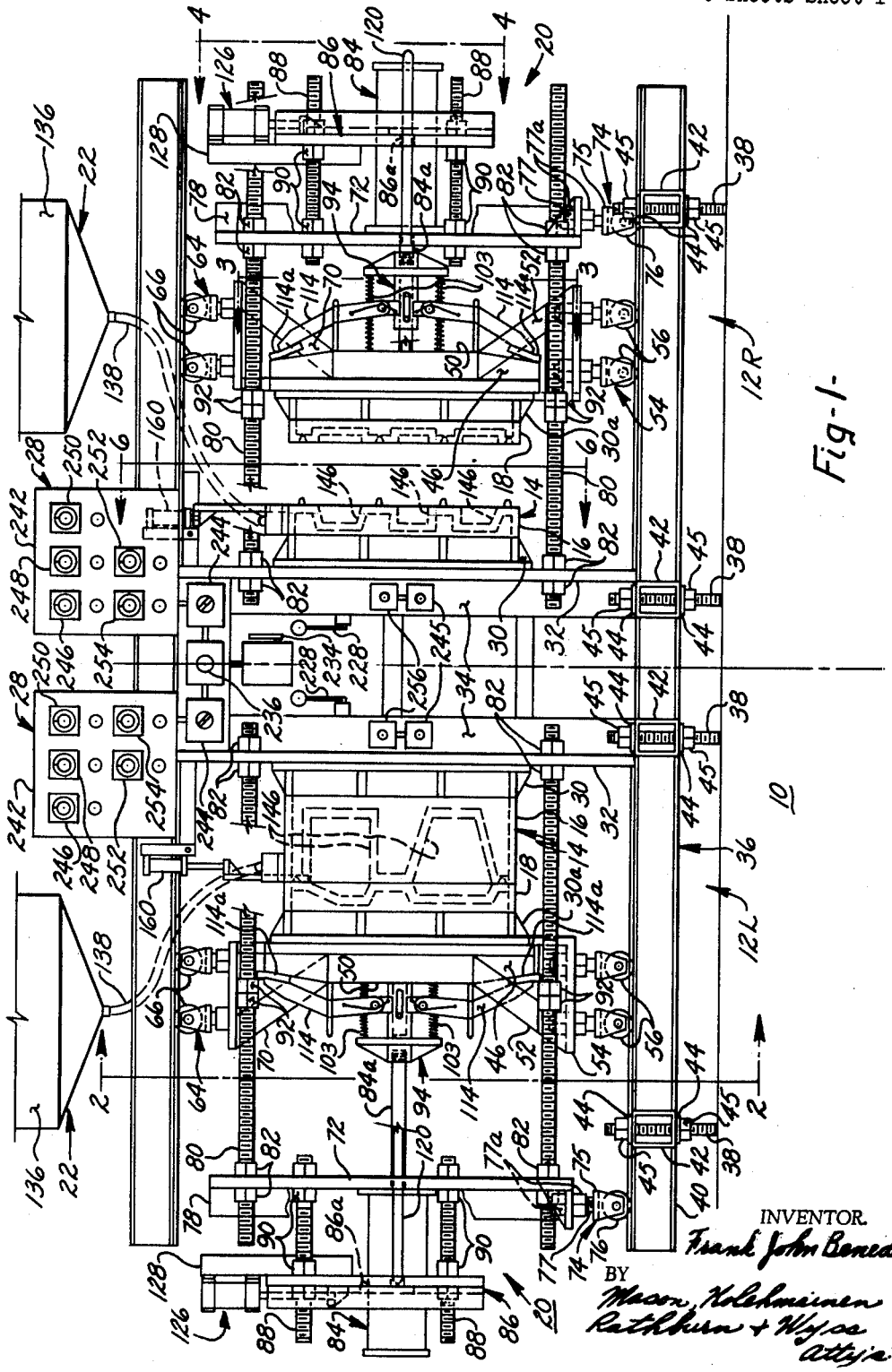
Fig-1-
INVENTOR.
Frank John Benedetto
BY
Mason, Kolehmainen,
Rathburn & Wyss
Attys.

July 21, 1964 F. J. BENEDETTO 3,141,192
MOLDING APPARATUS
Filed Dec. 19, 1961 6 Sheets-Sheet 2
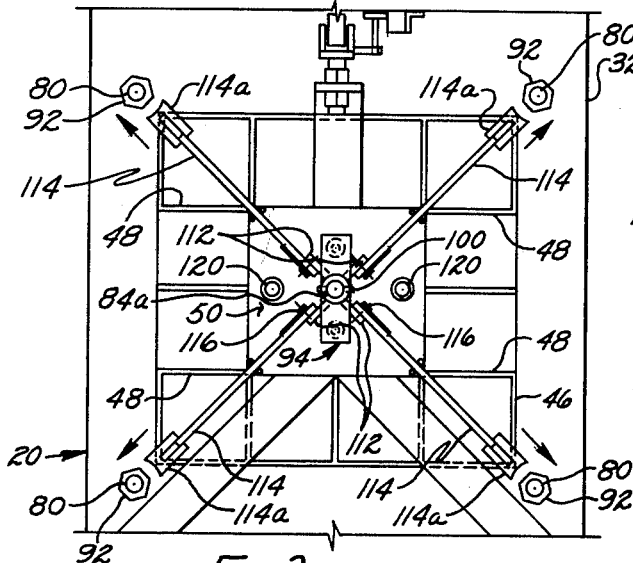
Fig-3-
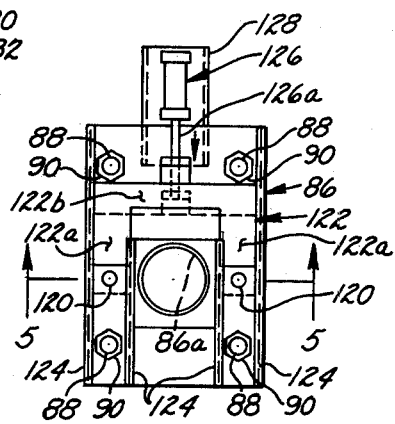
Fig-4-
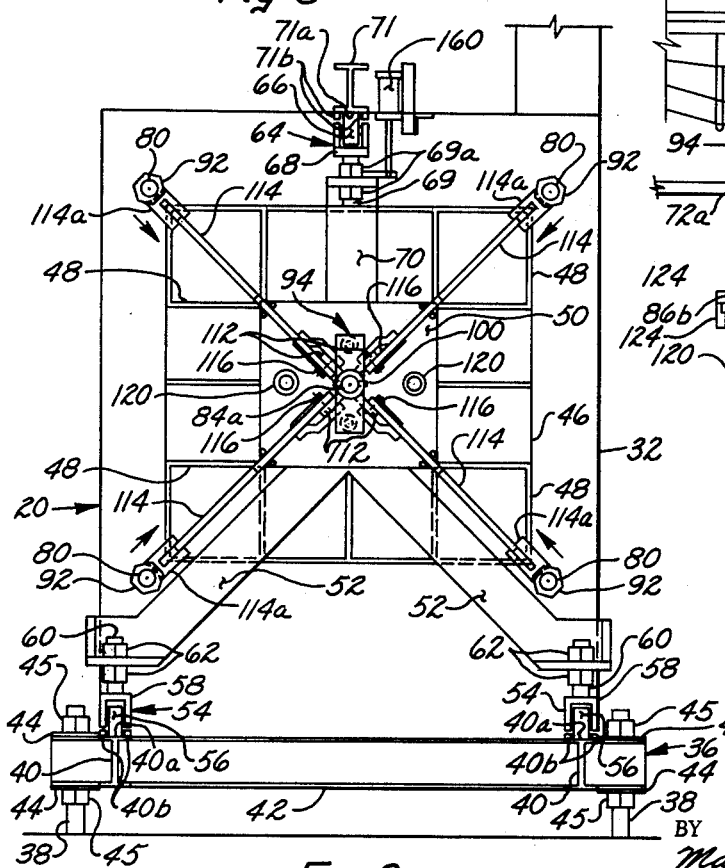
Fig-2-
Fig-5-
INVENTOR.
Frank John Benedetto
BY
Mason, Kolehmainen
Rathburn, Wyss
atty's:

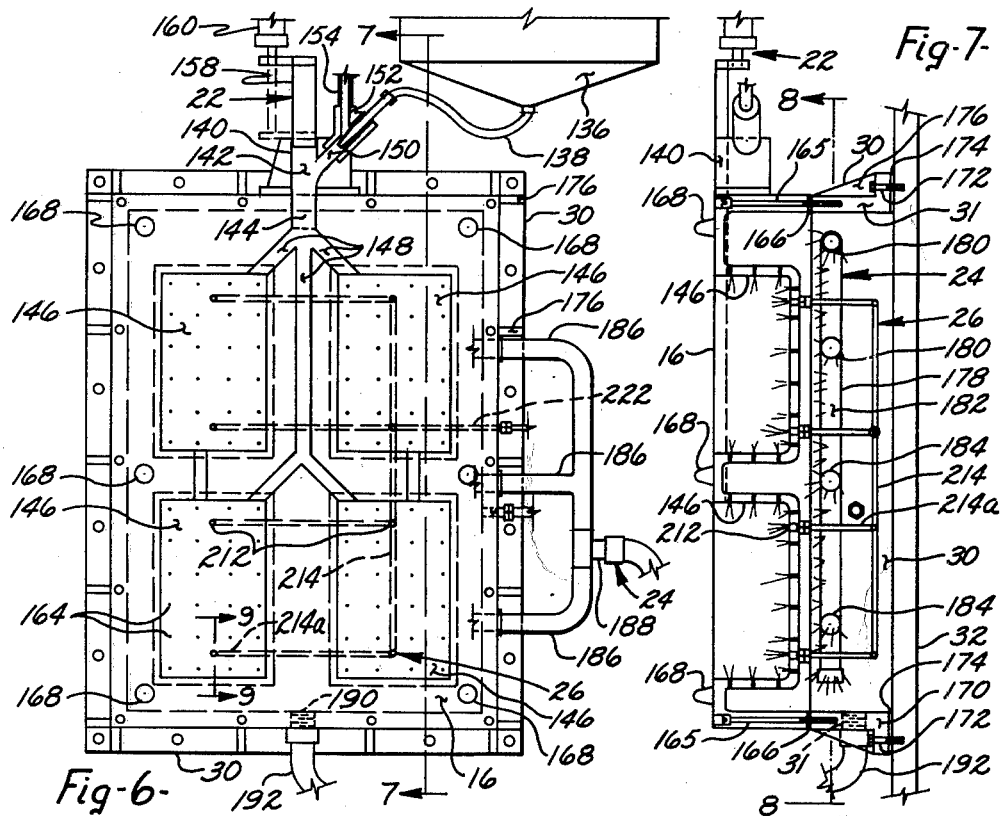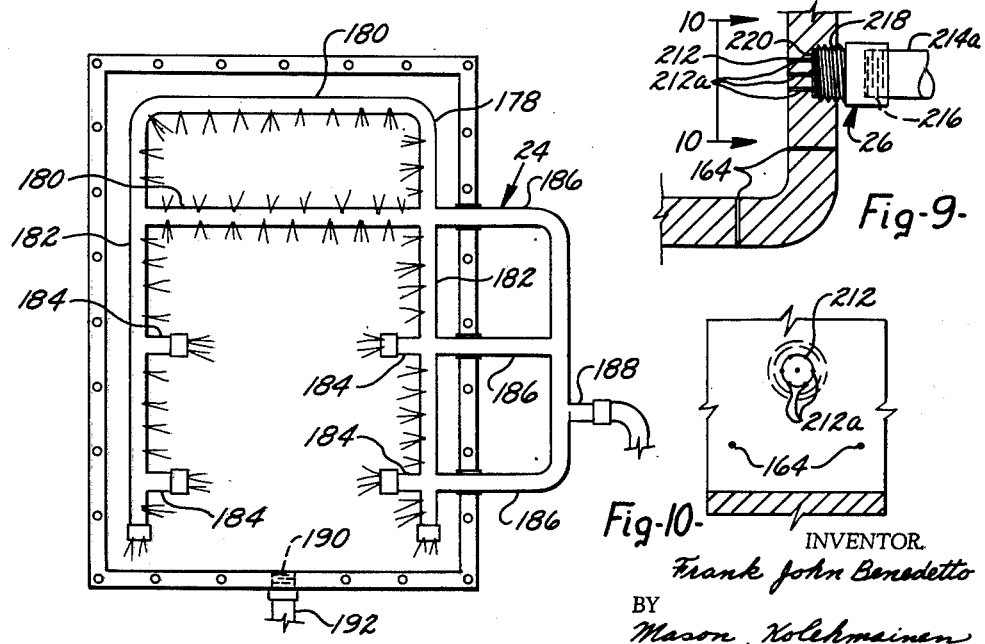

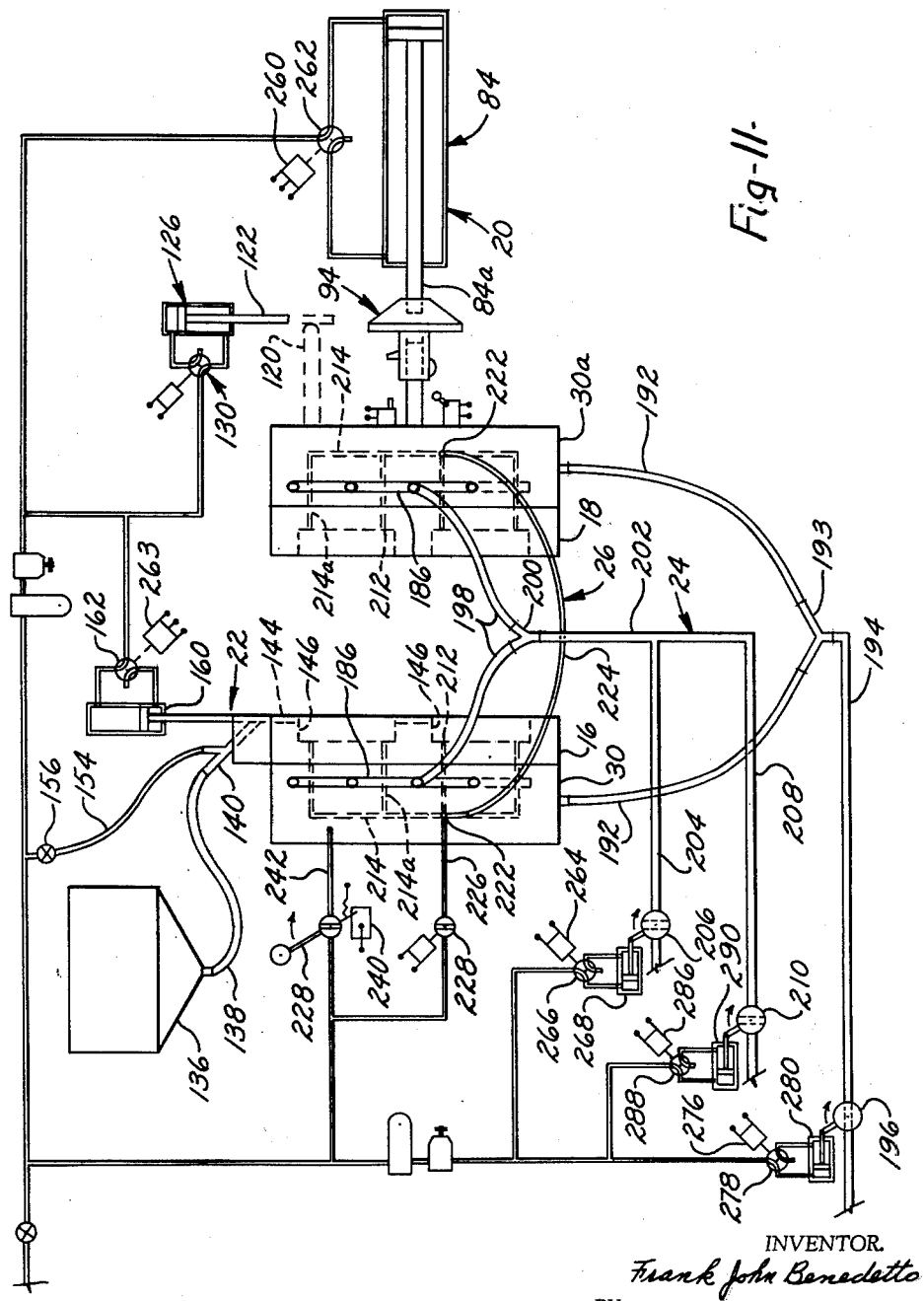

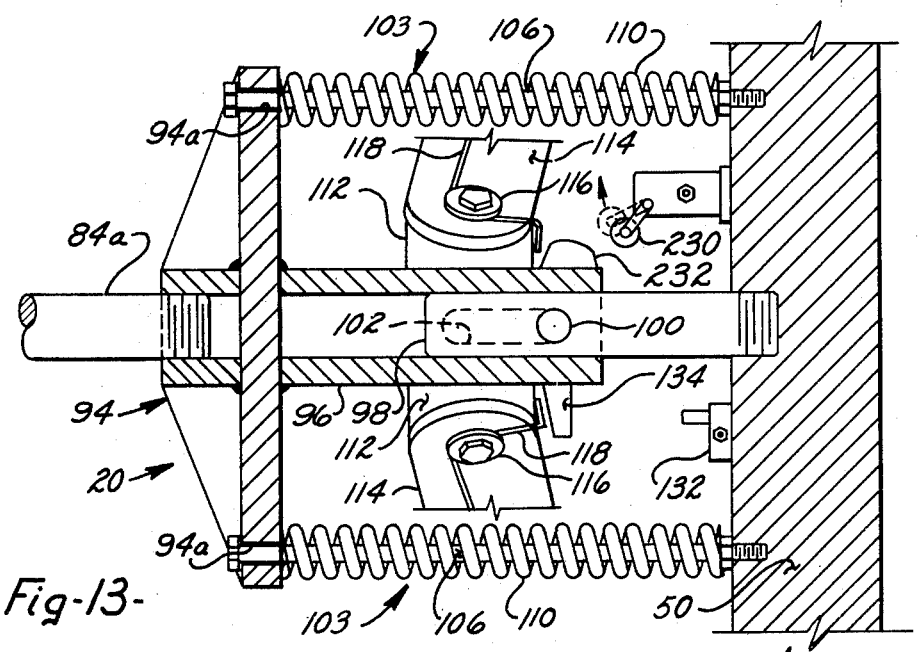
Fig-13-
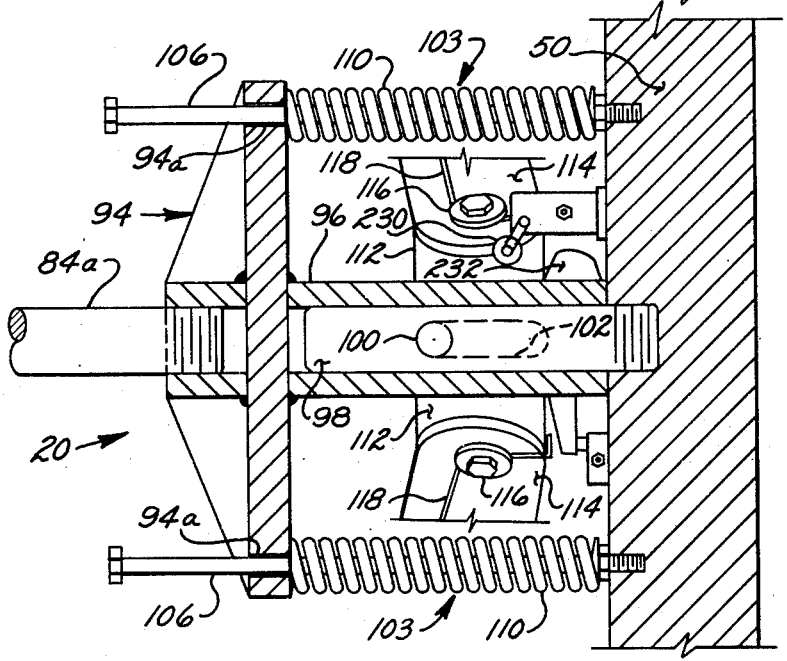
Fig-14-

United States Patent Office 3,141,192
Patented July 21, 1964

3,141,192
MOLDING APPARATUS
Frank John Benedetto, Harwood Heights, Chicago, Ill., assignor to Creative Ideas Inc., Lake Forest, Ill., a corporation of Delaware
Filed Dec. 19, 1961, Ser. No. 160,497
6 Claims. (Cl. 18—5)

This invention relates generally to apparatus for producing molded products and more particularly it relates to an automatic molding device for rapidly producing molded products composed of plastic materials and particularly molded products composed of expanded and fused or welded together polystyrene beads.

In recent years the use of molded products composed of expanded and welded together polystyrene beads has become widespread due to the desirable characteristics of these products. Products composed of expanded and welded together polystyrene beads are extremely light in weight per unit volume, almost impervious to water and other liquids, good thermal insulators, and are relatively low in cost when produced in quantity.

Because of these desirable characteristics wide usage has been made of these products in the packaging industry especially when delicate instruments such as electronic parts, cameras, watches, etc. are to be packaged so that rough treatment encountered during shipping of these articles does not break or injure them. Also great savings in packaging labor and time are obtained by utilizing blocks of molded polystyrene for supporting delicate articles on their non-critical portions.

Because of this usage there is a wide spread need for a molding device to produce packaging blocks of polystyrene at high rates of production equal to or greater than the rate of production of the article to be packaged. It is undesirable to make up a large number of the packaging blocks in advance in order to keep up with an assembly line because manufacturers do not like to utilize valuable manufacturing space for the storing of them. Also because of the extreme lightness of articles composed of polystyrene it is not economical to ship large quantities any appreciable distance. Therefore, it is desirable to ship the raw polystyrene beads which have not been expanded in bulk to or near locations where they are molded into usable shapes and utilized for packaging of products as they come off the manufacturer's assembly line.

In preparing molded products from the polystyrene beads, the unexpanded bulk beads are first pre-expanded prior to introduction into the molds. This pre-expansion is usually done by introducing steam into an agitated mass of the beads at temperatures low enough so that the beads do not weld together and are still free flowing. Of course the ultimate grain or bead size of the finished molded product will determine the amount of pre-expansion desired and the temperature of the steam or length of time the beads are exposed to the steam can be adjusted accordingly. It has also been found that the pre-expanded beads must be used in molding within a reasonable time after they are pre-expanded in order to give good results in the finished molded product.

The pre-expanded beads are then placed in a mold of the desired shape, and the mold is then closed tightly and is heated to temperatures which cause the beads to expand further and weld together into a homogeneous mass in the shape of the mold cavity. During the heating of the beads causing them to expand and weld together, pressures in the range of 40 p.s.i. are sometimes developed in the mold cavity. Again, the temperature of the heating medium applied, usually steam, and the length of time applied determines the grain or bead size of the finished product and also determines whether the beads are completely welded together properly. Where large multi-cavity molds are utilized having considerable area, it will be readily seen that large forces may be required to hold the mold together at the molding pressures used. While this problem is not great on single cavity, small area molds, because of the desire for high production rates demanding the use of large multi-cavity molds, it becomes a problem of major proportion.

After the heating and welding together of the beads in the mold, it is necessary to let the molded product remain in the mold for a period of time in order that the beads will not collapse when they are rapidly cooled in preparation for removal from the molds. This period is generally called the "dwell period" in the art and the length of time needed is dependent on various factors including the grain size of the beads, the various intricate shape of the mold and the like.

After the dwell period, the beads are cooled before removal from the mold as finished products. The amount of cooling is determined by the temperature of the cooling medium, generally water, and the length of time the medium is applied. During the cooling periods the beads take on set and further expansion and welding is curtailed.

The mold is then opened and the finished products are removed and the joint edges and sprue connections are trimmed off.

Early machines for molding products of expanded and welded polystyrene were hand machines which required the constant attention of an operator for hand filling the mold, clamping the mold sides together, applying the heat and the cooling mediums to the mold and finally removing the finished products from the mold. These hand operated machines were necessarily slow and costly in labor and would not meet the demand for a high quality product at the rapid production rates necessary.

Other machines were built attempting to speed up the production rate over the hand machines. Because of the need for high production rates generally, multi-cavity molds of relatively large areas were used producing large forces on the molds. Because of these forces, hydraulic cylinders were utilized to hold the molds together. These machines have many disadvantages, some of them being the high cost of hydraulic systems and constant maintenance problems encountered with such systems. Also, in order to distribute the force of the hydraulic cylinder over a larger area of the mold, either more than one cylinder was needed or heavy bracing of the mold backs is required in order to keep the molds tightly clamped together all around the periphery. Even this did not solve the problem and many times the molds would open and spew the hot beads out and ruin the final product. Other attempts were made to cure this problem utilizing various catches and dogs to hold the molds together, but these were largely unsuccessful and until the present invention, a reliable, relatively low cost, high production rate, fully automatic molding machine for producing molded articles from expanded and welded together polystyrene beads was not a reality.

Therefore, it is a general object of the present invention to produce a new and useful molding device for producing molded products of plastic materials and especially of expanded and welded together polystyrene beads which is extremely reliable, economical to operate, fully automatic in operation, relatively low in cost, capable of high production rates and yet is relatively small in size and weight.

Another object of the invention is to produce a new and useful molding device of the type described above which does not require the use of hydraulic cylinders to hold the molds together yet still can accommodate large area, multi-cavity molds.

Another object is to produce a new and useful molding machine of the type described above in which the molds are tightly held together at a multiplicity of positions preventing any separation of them when the mold is under pressure encountered during expanding and welding of the beads.

Another object is to produce a new and useful molding device of the type described above in which the molds are held together with greater force as the molding pressure increases.

Another object is to produce a new and useful molding device of the type described above in which the molds are preheated before the material to be molded enters the mold cavities in order to reduce the heating time.

Another object is to produce a new and useful molding device of the type described above in which the molds are rapidly moved together and locked tightly together at a multiplicity of points on the molds as they are preheated.

Another object is to produce a new and useful molding device of the type described above in which the molds are rapidly filled with the material to be molded by air pressure while the molds are closed and locked together until completely filled and then the flow of material is shut off and the filling opening or sprue in the mold is plugged and any material in the filling conduit near the machine is returned back to the material hopper.

Another object is to produce a new and useful molding device of the type described above in which rapid heating of the material in the mold is accomplished in a relatively short controllable period of time.

Another object is to produce a new and useful molding device of the type described above in which after the rapid heating cycle of the material in the mold the material is allowed to remain in the mold for a controlled period of time before the cooling cycle begins.

Another object is to produce a new and useful molding device of the type described above in which the material in the mold is rapidly cooled for a controlled period of time before the mold is opened.

Another object is to produce a new and useful molding device of the type described above in which the finished products in the mold are automatically ejected from the mold when it opens.

Another object is to produce a new and useful molding device of the type described above in which an additional manually controlled mold ejection system is provided to eject the finished products from the mold.

Another object is to produce a new and useful molding device of the type described above in which the mold closing, mold locking and preheat phase as well as the loading phase and the heat welding phase, dwell phase, cooling phase, and the mold unlocking, mold opening and product ejecting phase can be adjustable and accurately set to automatically control the operation of a complete cycle of the machine.

Another object is to produce a new and useful molding device of the type described above in which there is provided an operator safety device which upon actuation will cause any steam or water flow to the machine to cease immediately and the mold to unlock and open and stay in the fully open position until the operator initiates a new phase.

Another object is to produce a new and useful molding device of the type described above in which the molds can be easily and rapidly changed with a minimum of time and effort.

Another object is to produce a new and useful molding device of the type described above in which a variety of sizes and thicknesses of molds can be utilized with a minimum of adjustments on the machine.

Another object is to produce a new and useful molding device of the type described above in which the movable platen carrying one side of the mold can be easily adjusted to accommodate for wear on the molds and their centering pins and thus insure proper alignment of the molds.

Another object is to produce a new and useful molding device of the type described above in which two sets of different molds can be utilized at one time with each set being individually controllable by automatic timing means.

Another object is to produce a new and useful molding device of the type described above in which the same manifold can be utilized for carrying both the heating and cooling mediums at various pressures to the molds.

Another object of the invention is to produce a new and useful molding device of the type above in which just prior to the closing and locking of the molds any steam condensate collecting in the mold cavities during preheating is removed.

Further objects and advantages of the invention will become apparent as the following description proceeds and the nature of the invention will best be understood when described in connection with the accompanying drawings in which:

FIG. 1 is a front elevational view of an automatic molding device as characterized by the features of the present invention having portions broken away for clarity;

FIG. 2 is a left end sectional view of the improved molding device taken along line 2—2 of FIG. 1;

FIG. 3 is a right end sectional view of the improved molding device taken along line 3—3 of FIG. 1;

FIG. 4 is a fragmentary end elevational view of the improved molding device taken along line 4—4 of FIG. 1;

FIG. 5 is a fragmentary sectional view of the improved molding device taken along line 5—5 of FIG. 4;

FIG. 6 is a sectional view of the improved molding device taken along line 6—6 of FIG. 1;

FIG. 7 is a fragmentary sectional view of the improved molding device taken along line 7—7 of FIG. 6;

FIG. 8 is a fragmentary sectional view of the improved molding device taken along line 8—8 of FIG. 7;

FIG. 9 is an enlarged sectional view of the improved molding device taken along line 9—9 of FIG. 6;

FIG. 10 is an enlarged sectional view of the improved molding device taken along line 10—10 of FIG. 9;

FIG. 11 is a flow diagram showing the air, steam and water flow in the automatic molding device of FIG. 1;

FIG. 13 is an enlarged detailed side elevational view of the locking actuation mechanism of the molding device of FIG. 1 shown in one of its operating positions; and FIG. 14 is an enlarged detailed side elevational view of the locking actuation mechanism of FIG. 13 shown in another of its operating positions.

Figure 12:
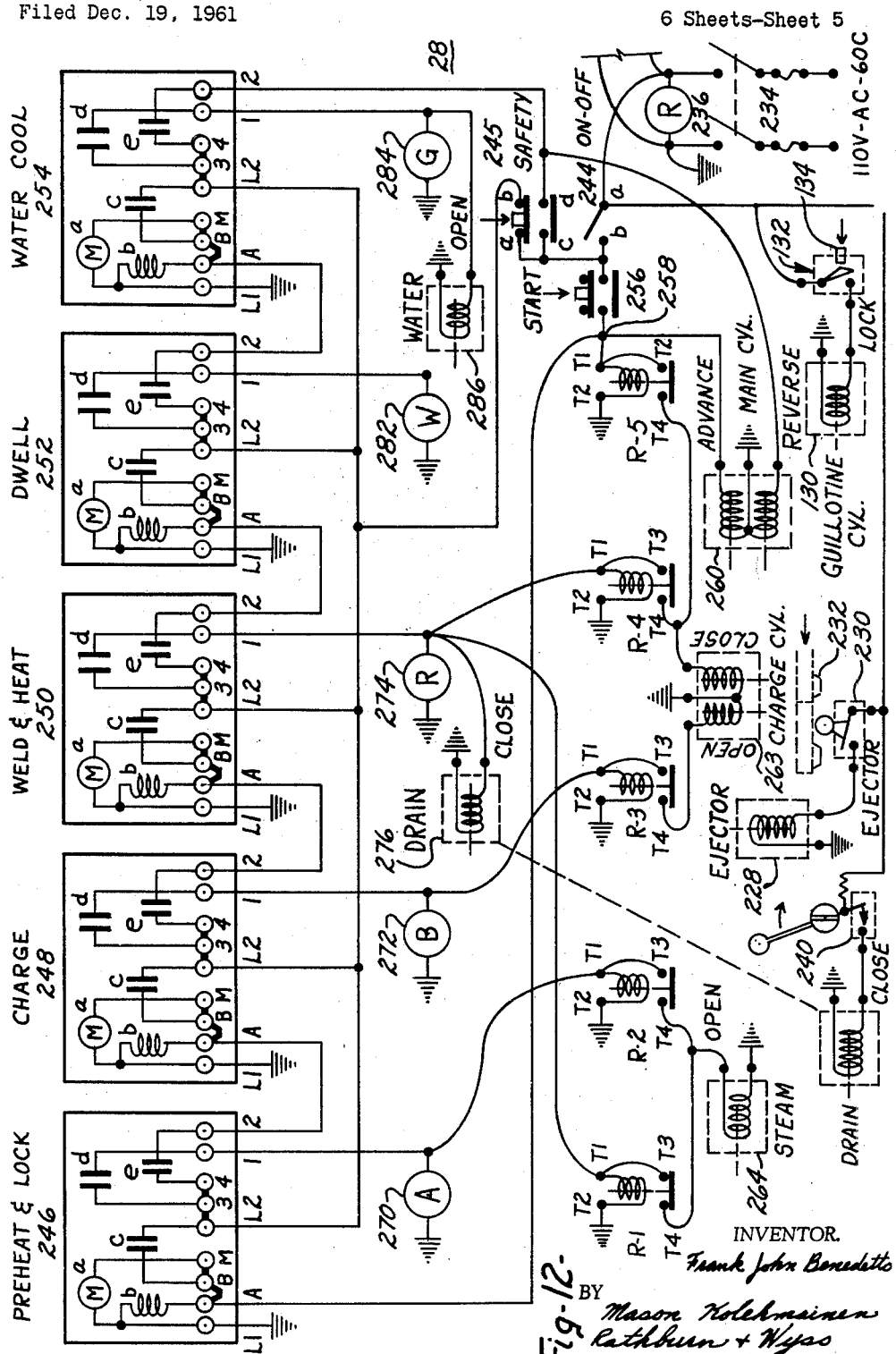
FIG. 12 is a schematic diagram showing the electrical circuit of the automatic molding device of FIG. 1.

Briefly, according to the present invention, there is provided a new and improved apparatus for producing molded products such as of polystyrene and the like and which is provided with an improved means of supporting the mold and locking the mold in closed position. More specifically, the apparatus includes a frame formed of a plurality of horizontally positioned track forming members and carrying a fixed vertically positioned first platen for supporting the cope of a mold. A vertically positioned second platen is adjustably interconnected to the first platen by a plurality of threaded tie rods. The second platen is provided with vertically adjustable roller means riding on at least some of the track members forming the frame. A vertically positioned movable third platen is positioned intermediate the first two platens for supporting the drag of a mold in movable confronting relation to the cope and is provided with a plurality of roller assemblies each riding on one of the track members. Each of the roller assemblies includes a pair of longitudinally spaced, vertically adjustable roller means riding on a respective one of the track members forming the frame. In this manner, the second platen is readily adjustable relative to the first platen to provide for proper alignment thereof and additionally to compensate for molds of various depth. Additionally, the third platen carrying the drag of the mold can be quickly and accurately aligned in all directions with the cope of the mold.

The platen carrying the drag is moved relative to the second platen by an air actuated cylinder mounted on the second platen and including a movable piston rod carrying a crosshead. The crosshead is provided with a hollow tube having diametrically opposed axially elongated slots and a guide rod extending from the third platen is slidably received in the tube and is provided with a crosspin slidably received in these slots to provide a lost-motion type of connection between the piston rod and the movable platen. Moreover, the rod interconnecting the fixed platens are provided with pairs of nuts threaded thereon forming locking members on the rods. A pair of locking arms are provided which are pivotally connected to the crosshead and extend radially toward the locking members, aligned with the corners of the movable platen. The locking arms are provided with locking dogs which slidably bear against the corners of the movable platen, and pivoting of the locking arms pivots and slides the locking dogs into clamping relation between the locking members on the rod and the corners of the movable platen to tightly clamp the movable platen in a mold-closed position. It will be appreciated that the load is transmitted from the locking arms to the rods eccentrically locating the rods and, consequently, the rods tend to bow outwardly and effect a tightening movement of the fixed platens relative to each other, thereby to more tightly close the mold as the pressure within the mold is increased.

According to another feature of the present invention, the operation of the molding apparatus is wholly automatic. The apparatus includes means for supplying beads of polystyrene or similar material to the mold, means for supplying steam to the mold, means for supplying cooling water to the mold, and means forming a drain communicating with the mold. The operating cycle of the molding apparatus is manually initiated and initiation thereof is effective to close the mold means and to place in operation a plurality of automatic timed control means to sequentially cycle the apparatus including controlling the supply of beads from the bead supply means, controlling the steam supply, controlling the water supply, and controlling the drain.

According to another feature of the present invention, the molding apparatus is provided with a safety device so that actuation thereof is effective to open the mold and to shut off the supply of beads, steam or water to the apparatus and to open the drain of the apparatus.

An additional feature of the present invention is that the molding apparatus is provided with means for automatically supplying a momentary blast of air during closure of the mold to blow out any condensate or other particles which may have formed in the mold and, additionally, to provide an additional momentary blast of air to the mold during the opening of the molds to eject the molded articles.

A further feature of the present device is that the molding machine is provided with means for preheating the molds during closing thereof thereby to minimize the time needed to heat, expand and weld the beads after filling of the mold therewith.

According to yet another feature of the present invention, the molding machine is provided with high pressure steam which is thereafter throttled in the mold so that the additional heat energy available in high pressure steam is made available for the heating, expansion and welding of the beads.

Referring now to the drawings, there is illustrated an automatic molding machine 10 as characterized by the features of the present invention comprising two operating sections 12L and 12R. Each operating section is comprised of a mold 14 having a stationary cope 16 and a movable drag 18, movable toward and away from the cope. A mold moving and locking assembly generally indicated at 20 is provided in order to move the drag 18 toward and into contact with the cope 16 in closed position where the two are then locked together and thereafter to unlock them and move the drag 18 away from the cope 16.

Mold filling apparatus generally indicated at 22 is provided to fill the mold 14 with material to be molded when the cope 16 and drag 18 are in the closed and locked position. A mold heating and cooling system generally indicated at 24 is operatively associated with the mold 14 in order to heat the mold causing the polystyrene beads therein to expand and weld together in a homogeneous mass, and thereafter to cool the molded product in the mold prior to the unlocking and opening thereof. A mold ejection system generally indicated at 26 is provided for ejection of the molded products from the mold when it opens. An electrical control system generally indicated at 28 is provided in order to control and coordinate the operation of the machine 10 and the enumerated assemblies and systems.

The cope 16 is carried on a first mold chest 30 which is mounted on a vertically oriented fixed position mold platen 32 (FIGS. 1 and 2) comprised of heavy plate and stiffened with bracing structure 34 on its inward face. The fixed platen 32 is carried by a base 36 which is supported from the floor by a plurality of adjustable legs 38. The base 36 is fabricated of structural shapes and comprises a pair of parallel longitudinal side beams 40 which are joined by welding to a plurality of transversely oriented cross members 42. The cross members 42 are comprised of channels which are placed with their flanges abutting and welded together to form a box beam. The ends of the cross members 42 extend outwardly beyond the side beams 40 in order to carry plates 44. The legs 38 are comprised of heavy rods which are threaded and extend through vertically aligned apertures in the plates 44 and cross members 42. Adjusting nuts 45 are provided above and below the plates 44 in order that the legs 38 can be readily adjusted to provide the proper distance from the base 36 to the floor. It is desirable to have individual adjustable legs in order to compensate for any unevenness or slope in the floor. Also, long legs may be provided in order to raise the machine high enough off the floor so that if desired a belt conveyor or water trough can be placed underneath to carry away the finished molded products as they are ejected from the mold and drop downward.

The drag 18 which forms the movable half of the mold 14 is carried on a second mold chest 30a which is mounted on a movable mold platen 46 which is in parallel facing relation with and movable toward and away from the fixed platen 32 in order to open and close the mold. The movable platen 46 is provided with four corner bracing sections 48 and a center bracing section 50 in order to adequately stiffen and brace the platen 46, which is constructed of heavy plate.

The movable platen 46 is supported by a pair of outwardly and downwardly extending support legs 52. The lower ends of legs 52 are carried by dual roller assemblies 54, each having a pair of rollers 56. Each roller is rotatably mounted on a truck 58 (FIG. 2) which is attached to the lower end of the member 52 by means of a threaded rod 60 and adjusting nuts 62. By adjusting the rods 60, the movable platen 46 can be raised or lowered, tilted forward or backward or rotated laterally with respect to the longitudinal axis of the machine 10. This adjusting feature is desirable to insure that the platen 46 is always parallel to the fixed platen 32 and thus to insure proper meeting of the cope 16 and drag 18 when they are brought together. The rollers 56 roll in a quick track 40a formed by welding two pieces of keystock 40b on the top surface of the longitudinal side beams.

The upper end of the movable platen 46 is guided during movement by another dual roller assembly 64 having a pair of rollers 66 rotatably mounted in trucks 68 (FIG. 2). The trucks 68 are adjustably supported on threaded rods 69 with adjusting nuts 69a for raising and lowering the trucks. The lower ends of the rods 69a are attached to the upper end of a center positioned assembly support leg 70 which is attached to and extends upwardly and outwardly from the outer surface of the movable platen 46. The rollers 66 ride in an upper guide track 71a which is formed by welding two pieces of keystock 71b to the bottom flange of an upper guide beam 71. The upper guide beam 71 is supported at its central portion by the fixed platens 32 and is disposed along the central longitudinal plane of the machine 10. Thus, the movable platen 46 and associated parts are supported and guided for movement toward and away from the fixed platen 32 by means of the two lower roller assemblies 54 and the upper roller assembly 64 insuring that the movable platen 46 is always parallel and properly aligned with the fixed platen 32.

Mounted outwardly from the movable platen 46 and in parallel facing relation thereto is a third fixed platen 72. The platen 72 is supported at its lower end by roller assemblies 74, which have adjustable rollers 76 which also ride in the guide tracks 40a. The rollers 76 are rotatably mounted in trucks 75 which are attached to the lower corners of the platen 72 by means of threaded rods 77 and adjusting nuts 77a. This platen 72 is also constructed of heavy plate and is reinforced on its outer face by bracing and stiffening structure 78. The platens 72 and 32 are held in the proper spaced relationship by four stress rods 80. The rods 80 are of suitable diameter to take stress occasioned by the molding pressures encountered in the mold. The rods 80 are threaded their entire length and accommodate adjusting nuts 82 positioned on both sides of the platens 72 and 32 to secure the platens to these rods 80 with the proper distance between the platens. As can be seen from FIG. 1, the molding machine 10 will accept molds 14 of different thickness, and when molds of larger thickness are employed in the machine, as illustrated in section 12L thereof, the platen 72 will be spaced a greater distance from the platen 32 than when a mold of smaller thickness is used, as illustrated in section 12R thereof.

In order to move the platen 72 inwardly or outwardly, the adjusting nuts 82 clamping the platen are loosened and it is moved to the desired position and the nuts 82 retightened. The roller assemblies 74 provide for ease in movement of the platen 72 when molds are being changed and the adjusting features of the roller assembly allow for vertical movement of the platen 72 so that it will face the platen 32 in proper axial alignment.

A double acting main air cylinder 84 is positioned at the center of the platen 72 with its axis of thrust perpendicular to the face of the platen 72. The forward flanged end of the cylinder 84 is suitably fastened to the outer surface of the platen 72 and piston rod 84a of the cylinder 84 passes through a suitable opening in the center of the platen 72.

A smaller fourth guillotine platen 86 is positioned outwardly from the platen 72 and supported therefrom by another set of four rods 88 positioned near the four corners of the platen 86. The platen 86 is also constructed of heavy plate and adjusting nuts 90 are provided on the rods 88 at both sides of the platens 86 and 72 to secure these platens to the rods 88 with the proper distance between the platens in parallel facing relation to each other. A central opening 86a is provided in the platen 86 in order that the body of the main air cylinder 84 can extend outwardly therethrough.

Double stop nuts 92 are positioned on the four stress rods 80 intermediate the platens 72 and 32 for purposes to be discussed hereinafter. It will be noted from FIGS. 1, 2 and 3 that the four corners of the movable platen 46 are in close proximity to but just clear the nuts 92 in order that the platen 46 can be moved past the nuts 92 in both directions without engagement therebetween.

The outer end of the cylinder rod 84a is threadedly engaged with a crosshead 94, as shown in enlarged detail in FIGS. 13 and 14. The inner face of the crosshead 94 has welded thereto a central tube 96 which is in concentric axial alignment with the cylinder rod 84a and extends inwardly toward the movable platen 46. The outer surface of the center bracing section 50 of the movable platen 46 threadedly receives one end of a rod 98 which is slidable within the tube 96. The rod 98 is provided with a cross pin 100 which slides in a pair of longitudinal slots 102 defined in the walls of the tube 96. The ends of the slots 102 act as stops in limiting the extent of sliding action between the rod 98 and the tube 96 and also the slots 102 prevent the rod 98 from rotating relative to the tube 96.

Spaced outwardly and parallel from the central axis of the tube 96 in a vertical plane are a pair of spring assemblies 103. Each assembly is comprised of a guide rod 106, one end of which is threaded into center bracing section 50 of the movable platen 46. The rods 106 extend through apertures 94a defined adjacent the outer radial ends of the crosshead 94. Compression springs 110 encircling the rods 106 are disposed between facing surfaces of the crosshead 94 and the center bracing section 50 of the movable platen 46 tending to normally bias these two members apart and keeping the cross pin 100 against the right hand end of the slots 102 in the tube 96 as viewed in FIG. 13.

Welded to the outer surface of the tube 96 are four arm support brackets 112. These brackets 112 are aligned along lines drawn from the center axis of the tube 96 to the four corners of the platen 46 as is best shown in FIGS. 2 and 3. Four toggle arms 114 are pivotally attached to the brackets 112 by pivot bolts 116. These arms 114 extend outwardly toward the four corners of the movable platen 46. At the outer ends of the arms 114 there are provided locking dogs 114a (FIGS. 2 and 3) which are comprised of small plates with the outer ends bent or welded slightly upward. Springs 118 (FIGS. 13 and 14) coiled around the pivot bolts 116 and having ends attached respectively to the brackets 112 and arms 114 bias the arms 114 toward the platen 46 and prevent the arms from flopping and falling away from the platen 46 when the mold is unlocked. As can be seen from FIG. 1, the forward face of the locking dogs 114a is always abutting the outer corner of the corner brace section 48 of the platen 46 regardless of whether the mold is open or shut.

It will be noted from FIGS. 1 and 3 that when the mold is unlocked the outer ends of the locking dogs 114a just clear the stop nuts 92. When the movable platen 46 is moved inwardly by the cylinder 84 and the abutting faces of the cope 16 and drag 18 first touch, the back surface of the locking dogs 114a has moved to a position at or slightly inwardly of the inner face of the inner stop nut 92. At this point the cylinder rod 84a continues to move toward the center of the machine compressing the springs 110 and causing the tube 96 to slide forward relative to the rod 98 until the end of the center tube 96 meets the face of the center bracing section 50 of the movable platen 46 and the cross pin 100 reaches the left hand end of the slots 102 as shown in FIGS. 1 and 14. As this happens, the arms 114 are pivoted about the pivot pins 116 and force the locking dogs 114a outwardly with their back faces engaging the inner faces of the inner stop nuts 92 thus locking the cope 16 and drag 18 together. The front faces of the locking dogs 114a push inwardly against the outer corners of the corner bracing sections 48 on the movable platen 46. Thus, as pressure is developed in the mold tending to force the cope 16 and drag 18 apart, forces are transmitted from four corners of the platen 46 through the corner bracing sections 48 to the front face of the locking dogs 114a and then from the rear face of the dogs 114a to the inner face of the inner stop nuts 92 on the stress rods 80 and through the lever action of the arms 114 to tube 96 and cylinder rod 84a. In addition, forces at the center of the mold are also transmitted from the center bracing section 50 of the platen 46 directly to the tube 96 to the cylinder rod 84a.

Since the distance between outer corners of the corner bracing sections 50 and the inner face of the inner stop nuts 92 is very small in comparison to the distance between said corners and the central axis of the cylinder rod 84a (approximately 1 to 50) the majority of the force is taken by the stress rods 80 and thus there is only a relatively small force on the cylinder rod 84a. It has been found in practice that multiple cavity molds having cavity facial areas totaling 1200 square inches and molding pressures of up to 40 p.s.i. can be utilized in the molding machine of the present invention equipped with a six inch air cylinder utilizing air pressures of 150 p.s.i. This is in sharp contrast to other machines not having the unique locking mechanism of the present invention, some of which require costly hydraulic cylinders in the range of four to eight inches and hydraulic pressures of 1000 to 2000 p.s.i. in order to accommodate similar molds and molding pressures.

It has also been found that stress rods having diameters of 1½ inches and platens constructed of ¾ inch plate are sufficient to take the stresses developed whereas former machines frequently required much heavier structure. In addition to the locking arrangement just described, there may be provided two locking rods 120, best shown in FIGS. 4 and 5, attached to center bracing section 50 of the movable platen 46. The rods 120 are aligned to lie parallel to the axis of the cylinder rod 84a in a horizontal plane therewith and on both sides thereof. These rods 120 slide through suitable apertures 72a and 86b defined in the platens 72 and 86 respectively as the movable platen 46 moves inwardly and outwardly. The outer ends of the rods 120 are rounded to form camming surfaces. When the mold is in the closed and locked position, the outer ends of the rods 120 lie a slight distance outwardly from the outer surface of the guillotine platen 86.

A knife or guillotine 122 is provided to slide up and down in sliding contact with outer face of the guillotine platen 86. The guillotine 122 is provided with two parallel legs 122a and an integrally joined cross piece 122b connecting the legs 122a together at their upper ends. The legs 122a are aligned to cover the apertures 86a when the guillotine 122 is in its lower position as shown in phantom in FIG. 5. The legs 122a are tightly held against the outer face of the platen 86 by guide members 124 which are attached to the platen 86 and form sliding guideways for the movement of the guillotine 122 up and down relative to the platen 86. As the guillotine legs 122a move downwardly past the apertures 86a when the mold is in a closed position, the inner faces of the legs 122a contact the outer rounded ends of the locking rods 120 and thus prevent them from moving outwardly as the mold is pressurized. As the ends of rods 120 and inner surfaces of the legs 122a wear after repeated contacts, the guillotine platen 86 can be moved inwardly by adjusting the nuts 90 in order to take up any slack caused by the wear and to insure that there is always contact between the rounded ends of the rods 120 and the legs 122a when the guillotine 122 is in its lower position. The guide members 124 may also be adjustably attached to the guillotine platen 86 in order that wear on these members and on the guillotine legs 122a can be compensated for and for insuring that the inner surface of the guillotine 122 is always in close facing contact with the outer surface of the platen 86. Moreover, the ends of the rods 120 extend slightly into the downward path of the guillotine 122 so that when it moves downward to the locked position the locking rods 120 will be put under compression thus taking most of the central load from the center bracing section 50 of the movable platen 46 and thus reducing the load on the cylinder 84.

In order to move the guillotine 122 up and down to lock the rods 120, a double acting guillotine air cylinder 126 is provided. The cylinder 126 is supported on a bracket 128 which is attached to the platen 86, and the lower end of the cylinder rod 126a is attached to the cross member 122b of the guillotine 122 in order to move it up and down as air is directed to the cylinder. A solenoid controlled air valve 130 (FIG. 11) is associated with the cylinder 126 and is spring biased to keep the cylinder rod 126a in the upper position and consequently the guillotine 122 out of the locking position.

In order to acuate the cylinder 126 in a downward position to lock the rods 120, a micro-switch 132 is positioned on the outer surface of the center bracing section 50 of the movable platen 46. The micro-switch 132 is electrically connected to the air valve 130 and causes the valve to admit air to the cylinder 126 to move the guillotine 122 downwardly with 1000 pounds of thrust when the micro-switch 132 is closed. The micro-switch 132 is closed by a cam 134 which is attached to the tube 96 and contacts the micro-switch 132 when the mold is in the locked position as illustrated in FIG. 14. Thus when the mold is closed and the locking dogs 114a move outwardly engaging the stop nuts 92 as previously described, the guillotine 122 also moves downwardly to lock the locking rods 120 under compression.

When the mold is thus locked, the platen 46 is held at a total of seven different places, at the four corners, by the two locking rods 120 near the center, and by the cylinder rod 84 at the center. The stress rods 80 take the majority of the force developed around the periphery of the platen 46. These forces are applied to the rods 80 eccentrically through the stop nuts 92 and tend to bow the rods 80 outwardly since the force is not applied along the axis of the rods. This slight outward deflection of the rods 80 tends to cause the central portions of the platen 72 and consequently the platen 86 and its associated parts to deflect inwardly. This inward deflection causes the inner surface of the guillotine 122 to push harder on the ends of the locking rods 120 and consequently to lock the mold tighter together as higher pressures are developed in the interior of the mold. This feature further insures that the cope 16 and drag 18 will be tightly held together as pressure is developed in the mold.

In order to unlock the mold, air pressure is directed to the reverse side cylinder 84 so as to cause the cylinder rod 84a to retract. This causes the tube 96 to move away from the center bracing section 48 of the platen 46 and allows the arms 114 to pivot, thus retracting the locking dogs 114a from engagement with the stop nuts 92. At the same time, movement of the tube 96 away from the center bracing section 48 opens the mciro-switch 132 which causes the guillotine 122 to move upwardly unlocking the locking rods 120 so that the platen 46 is free to move outwardly separating the cope 16 and drag 18 in order that the molded product can be removed from the mold.

Referring now to the mold filling apparatus 22 and FIGS. 6 and 11, polystyrene beads which have been pre-expanded to the desired size by heating with steam for a given time and temperature are loaded into hoppers 136. These hoppers 136 have conical bottoms and an outlet at the center thereof to allow the beads to flow freely out of the hoppers to the machine 10. The hoppers 136 are constructed of screen or other porous material having a plurality of small openings of a size which will not allow the beads to pass through but will allow air to circulate freely in order that beads do not become welded together in the hopper should quantities of steam pass over them from the machine 10 or other source accidentally.

A tube 138, preferably of flexible plastic material is connected to the opening at the bottom of the hopper 136 in order to direct a flow of beads to the machine as needed. The other end of the tube 138 is connected to a mold injector 140 which is mounted on the top center of the cope 18. A central passage 142 is provided in the injector 140 which is in communication and axially aligned with a main sprue 144 in the top of the cope 18 which communicates with a plurality of shaped cavities 146 in the cope. Branching sprues 148 are provided to communicate between the different cavities and the main sprue 144 to insure that all the cavities are properly filled. A venturi chamber 150 is provided in the mold injector 140 which angularly intersects and communicates with the central passage 142 and also is in communication with the tube 138 through a nozzle 152 which directs a flow of beads from the tube 138 into the venturi chamber. Air to provide a venturi action and to carry the beads into the mold cavities is introduced to the venturi chamber 150 around the nozzle 152 through the air tube 154 which is connected to a source of compressed air through a shut-off valve 156. Air entering the venturi chamber 140 from the air tube 154 draws the beads from the hopper 136 through the flexible tube 138 and nozzle 152 into the venturi chamber and blows the beads into the central passage 142, through the sprue 144 and branch sprues 148 into the mold cavities 146.

A slidable piston 158 is positioned to slide vertically within the central passage 142 and sprue 144 in order that the flow of beads to the mold can be controlled. Actuation of the piston 158 is accomplished by a double acting charge air cylinder 160 which is controlled by a solenoid valve 162. The piston 158 is movable from the position shown in solid lines in FIG. 6 downwardly to the position shown in phantom where the piston blocks the flow of air and beads to the central passage 142. When the piston is in this blocking position, the sprue 144 is blocked and the beads cannot expand and move up into the mold injector 140 where they might weld together and cause cloggage. Also, when the piston 148 is in this lower position, air entering the venturi chamber 150 moves back through the nozzle 152 and tube 138 to the hopper 136. This air flow completely flushes the mold ejector 140 and tube 138 removing any beads therein and transferring them back to the hopper 136 where they are continually agitated by the air flow from the tube. In this manner, any possibility of the beads becoming welded together and clogging in the mold injector 140, the tube 138 or the hopper 136 is eliminated. As the piston 158 is raised to the upper position, air is then allowed to flow into the mold carrying the beads into the mold cavities 146. Air which enters the cavities 146 during the filling operation escapes to the back of the mold cavities through a plurality of small openings 164 arranged in the walls of the cavities 146, illustrated in FIGS. 9 and 10. These openings 164 are relatively small so as to prevent the beads from passing through or clogging therein and are used for additional purposes discussed hereinafter.

The cope 16 and drag 18 forming the complete mold 14 are preferably constructed of aluminum or other alloy which has a high heat conductivity and will not rust when subjected to steam and water. The walls forming the cavities 146 in the cope and drag are generally about ⅜ inch in thickness. However, the thickness may vary depending on the dimensions of the cavity and the molding pressures utilized. The cope 16 and drag 18 are carried respectively on the mold chests 30 and 30a and are attached thereto around the periphery thereof with a plurality of countersunk screws 165, FIG. 8. A gasket 166 is interposed between the abutting surfaces of the cope 16 and chest 30 and the drag 18 and chest 30a to provide a tight seal therebetween. The cope 16 is also provided with a plurality of tapered alignment pins 168 which interfit with aligned tapered recesses in the drag 18 in order that the two members will be in good alignment when they are closed together.

The mold chests 30 and 30a are also preferably constructed of aluminum or aluminum alloys for the same reasons as stated above. The peripheral walls 31 of the mold chests are tapped at standard spaced intervals in order to receive the screws 165 which hold the cope and drag. Standard screw spacing may be used to facilitate the use of many different molds on the same mold chests. An integrally formed flange 170 is provided around the periphery of the wall of the mold chests 30 and 30a in order to facilitate the attachment of the chests to the platens which carry them. A plurality of cap screws 172 are used to hold the chests in place on the platens and a gasket 174 is provided between the abutting faces of the flanges 170 and the carrying platens. A plurality of integrally formed strengthening ribs 176 are provided to strengthen the walls 31 and the flanges 170 of the mold chests since relatively large and heavy molds may be carried.

Referring now to the mold heating and cooling system 24, there is provided in each of the mold chests 30 and 30a a manifold 178 preferably constructed of copper tubing. The manifold 178 is comprised of a plurality of horizontal tubes 180 at the upper portion thereof joined at their ends to vertical tubes 182. The lower ends of the vertical tubes 182 are capped and there are a plurality of inwardly directed horizontal stub tubes 184 attached to the vertical tubes 182 below the horizontal tubes 180. The manifold 178 is provided with a plurality of small holes which direct steam or water entering the manifold outwardly against the back surfaces of the mold cavity walls in order to uniformly heat these surfaces.

In order to provide uniform heating, it has been found that a greater amount of steam should be directed toward the upper portions of the mold since the steam eventually condenses to water and falls to the bottom of the chest. In this regard, there are more holes provided in the horizontal tubes 180 disposed at the top of the chest than there are in stub tubes 182 disposed toward the bottom. Also, the holes in the vertical tubes 182 can be spaced closer together at the top of the tubes than at the bottom.

Steam or water enters the manifold 178 through a plurality of feed tubes 186 which are connected to one of the vertical tubes 182 and extend through a wall of the chest. The outer ends of the feed tubes 186 are connected to a common feeder tube 188 which is connected to a source of steam and water through a network of tubes, pipes and valves to be later described. The steam and cooling water is introduced into the mold chests 30 and 30a through holes in the manifold 178, and it also passes through the plurality of small openings 164 in the walls of the mold cavities themselves and directly contacts the beads in the mold cavities 146.

These openings 164 are provided throughout the entire surface area of the cavities 146 so that a relatively even distribution of steam to all parts of the cavities is accomplished. The steam causes the beads in the mold cavities to expand and weld together to form a homogeneous mass. As the welding of the beads takes place, the openings 164 are gradually closed greatly reducing the flow of steam into the cavities. At this time in order to avoid an excessive buildup of steam pressure in the mold chests, the flow of steam is cut off by a valve to be later described. Thus, heating and cooling of the beads in the mold cavities is accomplished by direct contact of the heating or cooling medium as well as by the conduction heating through the walls of the cavity. This arrangement allows rapid heating and cooling of molded products and hence increases the production rate of the machine. It has been found that by the throttling action accomplished on the steam as it passes through the holes in the manifold 178 and through the openings 164 in the mold walls, excessive pressure is not developed in the mold cavities during heating and that consequently steam at pressures of up to 200 p.s.i. can be connected directly to the feeder tube 188 of the manifold without danger of excessive pressure which might burst the molds or chests. By utilizing steam at pressures of up to 200 p.s.i. in the manifold feeder 188, much more energy is available and is released where it is needed in the mold chest and the mold itself as the steam is throttled through the holes in the manifold 178 and the openings 164, and still excessive mold pressure is not developed. It has been found in practice that the manifold 178 can be constructed of ½ inch to ¾ inch tubing and that the feed tubes 186 and feeder tube 188 can be a little larger in diameter to obtain good flow characteristics and rapid heating. The openings in the wall 31 of the mold chests 30 and 30a where the feed tubes 186 pass through are sealed around these tubes to prevent steam or water from escaping to the outside.

The bottom wall of the mold chests 30 and 30a are provided with drain openings 190 to which are connected flexible drain hoses 192. The flexible drain hoses 192 from the mold chests 30 and 30a are connected together in a Y connection 193 to which is connected a drain pipe 194 (FIG. 11) having a solenoid controlled drain valve 196 for opening and closing the drain.

Steam and water is supplied to the feeder tubes 188 extending from the respective mold chests 30 and 30a by means of flexible hoses 198 which are also connected together at a Y connection 200. The flexible hoses 192 and 198 are needed to accommodate the movements of the drag 18 and its associated mechanism toward and away from the stationary cope 16 and its associated mechanism. The Y connection 200 is connected to a steam and water supply pipe 202. A steam supply pipe 204 is connected to the steam and water supply pipe 202 and is connected to a source of steam such as a boiler. A solenoid controlled valve steam valve 206 is positioned in the steam line 204 to control the flow of steam to the machine. A water supply line 208 is connected to the steam and water supply line 202 for supplying cooling water to the machine. The water supply line 208 is connected to a suitable source of cooling water and a solenoid controlled water valve 210 is provided in the line to control the flow of cooling water to the machine.

In order to further increase the speed of the molding machine, the cope 16 and drag 18 are preheated during the closing and locking of the mold. This preheating raises the temperature of the mold well above normal temperature prior to the filling of the mold so that when the filling is completed the temperature is still above normal and a shorter time is required during the heating phase to expand and weld the beads in the mold. Preheating of the mold is started immediately when the mold starts moving to close, and the mold closing movement can be initiated immediately after the molded products of the previous cycle have been ejected, and thus a further increase in the production rate of the machine can be obtained.

The mold ejection system 26 is comprised of an automatic system and a manual system, and the automatic system is also used to blow condensate from the mold just prior to mold closing during preheat. In order to automatically eject the finished products from the mold so they can drop out onto a suitable conveying system or be taken away by hand, each mold cavity 146 in the cope 16 and also in the drag 18, if desired, are provided with at least two sets of ejection orifices 212. The sets of orifices 212 comprises a group of closely orientated small individual orifices 212a (FIGS. 9 and 10) extending through the wall of the cavity 146. The orifices 212a are of a comparable diameter with the openings 164 so as to prevent beads from entering or clogging them. The sets of orifices 212 are preferably mounted in the deepest part of the mold cavities where sticking of the finished molded products in the mold is most likely to occur. The sets are also positioned in relation to each other within each cavity so as to fairly evenly distribute air pressure along the mold wall in back of the finished molded product. Each set of orifices 212 is fed from air manifolds located in the mold chests 30 and 30a. The manifolds 214 are preferably made of copper tubing and having connecting branches 214a which are connected to rear face of the mold wall at each set of orifices 212 by a fitting 216 which is threaded into a tapped hole 218 in the mold cavity wall. The hole 218 is in communication with all of the individual orifices 212a in each set. A screen 220 is placed on the inner end of the fitting 216 to prevent any impurities such as scale or the like from entering the cavity and also to prevent any small beads from moving into the air manifold 214 during expansion and welding of the beads in the cavity.

The manifolds 214 are connected to compressed air source through air lines 222 which pass through openings in the walls of the mold chests 30 and 30a. These openings are also sealed around the lines 222 to prevent leakage of steam or water from the mold chests. The air lines 222 from the mold chests 30 and 30a are connected together by a flexible air line 224 in order to accommodate relative movement between the cope 16 and drag 18. Air is supplied to the air line 224 from a source of compressed air through a supply line 226 having a solenoid controlled air valve 228.

The solenoid controlled air valve 228 is actuated by a micro-switch 230 which is positioned on the outer surface of the center bracing section 48 of the movable platen 46. The micro-switch 230 is closed momentarily and then released by the action of a cam 232 which is mounted on the tube 96. As the tube 96 moves toward the center bracing section 48 during locking of the the mold, the cam 232 momentarily closes and then releases the micro-switch 230 as it moves by. this momentary closure of the micro-switch 230 causes the solenoid controlled air valve 228 to momentarily open and deliver air pressure to the air manifolds 214 for a period of short duration. This short duration blast of air pressure blows out any condensate that has collected in the interior of the mold cavities from the preheat steam just before the mold is finally locked in the closed position. The length of duration of the air blast and the exact time at which it occurs and shuts off can be controlled by changing the shape and placement of the cam 232.

As the tube 96 moves away from the outer surface of the center bracing section 48 during the unlocking of the mold, the cam 232 again momentarily closes and then releases the micro-switch 230 as it moves by. This again causes the solenoid controlled air valve 228 to momentarily open and deliver air pressure to the ejection system for a short interval of time. This air develops sort of a pocket of air pressure in each mold cavity behind the finished molded product and, when the mold is unlocked and starts to open, this entrapped air forces the molded products out of the mold and they drop downwardly by gravity. It will be noted from the ejection, air blast is of short duration and is started and shut off during the unlocking cycle and before the cope and drag begin to rapidly move apart. This condition is desirable to effect a good air pocket behind the molded products and effectively eject them out of the mold cavities. If the cope and drag have separated a short distance when the air blast is delivered, the air pocket will not effectively be formed and the air coming from the orifice sets 212 will take the path of least resistance and flow out between the molded product and the mold walls all in one place and unsatisfactory ejection may result. To further aid in ejection of the finished products from the cavities, the cavities in the molds can be sprayed from time to time with a parting agent which aids in forming an effective air pocket for ejection and tends to reduce sticking.

In case a molded finished product sticks in a cavity in the mold after the mold is open, there is provided a manually controlled ejection system. The manual ejection system is comprised of a manually actuatable air valve 238 which is spring biased to the normally closed position. Air is supplied to the valve 238 from a common air pressure source on the machine. The valve 238 is also interconnected with a normally open electrical switch 240 so that, when the valve 238 is manually opened to admit air flow through the valve, the switch 240 is closed allowing current to flow therethrough. Air is directed from the valve 238 when opened to the mold chests 30 through the air pipes 242 communicating with the interior of the mold chests 30. At the same time electrical current is fed to the solenoid controlled drain valve 196 causing it to close. Air entering the mold chests 30 cannot escape through the drain valve 196 and is thus also directed into the mold chests 30a through the flexible hoses 198. The air thus filling the mold chests 30 and 30a can then only escape through the plurality of small openings 164 in the mold cavities. Air escaping through these openings tends to blow out any molded products which may have been stuck in the cavities.

As soon as the molded products are ejected the operator releases the handle of the air valve 238 and it returns under the force of the spring bias to its normally closed position shutting off air flow to the mold chests 30 and 30a. Also, the switch 240 is opened and the drain valve 196 returns to the open position as before.

Referring now to the electrical control system 28 which coordinates and controls the operation of the machine 10, there is illustrated in FIG. 12 an electrical system for controlling the operation of the machine. It will also be noted in FIG. 1 that all of the operating controls of the machine are located in the center of the machine between the two operating sections 12L and 12R. Since the wiring is similar for both sections, the wiring diagram in FIG. 12 pertains to only a single operating section and it is to be understood that both sections can be operated at the same time independently of each other by a single operator and that different molds can be used in each section at the same time, each having differently timed operating phases, if desired. Also, portions of the electrical system are shown in diagrammatic form in FIG. 11 of the drawings.

Since the machine 10 has no hydraulic cylinders requiring high pressure pumps and consequently large motors, it can be readily operated from 110 V., 60 cycle single phase A.C. current which is almost universally available.

Current is supplied to the machine through a fusable knife switch 234 which is located at the center of the machine within easy reach of the operator. When the switch is closed current is supplied to a red pilot light 236 connected across the energized line indicating the main switch 234 is closed. For convenience of description, one side of the line will be indicated by a ground symbol although in the actual wiring of the machine this side of the line is not grounded to the frame of the machine but is connected to several terminals on a terminal strip within electrical boxes 242 which are mounted on top of the platens 32. The ground wires from the various other electrical components are also connected to these terminals to complete the ground side of the line circuit. The other side of the line will be referred to as the hot side, B+, or line current side. After the current flows through the main switch 234, one side is connected to ground. The other side (line current side) goes to a terminal 244a of single-pole single-throw, on-off switches 244 which are positioned adjacent the red pilot light 236 near the center of the machine. The switches 244 are normally open and must be closed before either of the operating sections 12L or 12R of the machine can operate on a normal operating cycle. When the switch 244 is closed, the circuit is completed across the switch energizing the other terminal 244b.

In order to adjustably time each of the operating phases of the machine 10, there are provided five adjustable timers. These timers can be of various types but are preferably of a type similar to the HA Series, Microflex Reset Timers, manufactured as described in Bulletin 110, dated September, 1956, by the Eagle Signal Corporation of Moline, Illinois. The five timers are mounted in the front face of the electrical boxes 242 so that the faces of the timers are clearly visible and the time adjusting knobs can be easily set for the desired length of time by the operator of the machine. Timer 246 controls the time of the preheat and lock phase, timer 248 controls the mold filling time, timer 250 controls the time of the welding heat phase, timer 252 controls the time of the dwell phase, and timer 254 controls the time of the cooling phase of the machine. No timer is provided for the molding opening and ejection phase of the machine.

The timers 246 to 254 comprise timing motors 246a to 254a, motor clutch engaging solenoids 246b to 254b, pairs of holding contacts 246c to 254c, pairs of load contacts 246d to 254d and pairs of reset contacts 246e to 254e. Also, there are contained in each timer a total of nine terminals designated in order from left to right L1, A, B, M, L2, 3, 4, 1 and 2. The internal wiring of each of the timers 246 to 254 is identical and the terminals A, B and M are interconnected to each other by a tie bar and terminals L2, 3 and 4 are interconnected to each other by a tie bar. All of the line terminals L2 in the timers are connected to the terminal 244a of the on-off switch 244 through the safety or reverse push button 246 which will be described later.

The timer motors 246a to 254a are connected across the terminals L1 and M, the clutch solenoids 246b to 254b are connected across the terminals L1 and A, the holding contacts 246c to 254c are connected across the terminals B and L2, the load contacts 246d to 254d are connected across the terminals 3 and 1, and the reset contacts 246e to 254e are connected across the terminals 4 and 2. Operation of each of the timers 246 to 254 is identical and thus the operation of only the timer 246 will be described.

In operation of the timer 246, a momentary starting current from the start terminal 258 is supplied to the terminal A, thus developing line voltage across the terminals L1 and A, causing the timer motor 246a to start running, also the solenoid clutch 246b is energized engaging the motor 246a to start the time cycle. As the time cycle is started, the holding contacts 246c are closed thus keeping current from the line which is connected across the terminals L1 and L2 and continuing the energization of the motor 246a and the clutch solenoids 246b after the momentary starting current across the terminals L1 and A has ceased.

As the time cycle is started, the load contacts 246d are also closed. Thus current is available during the timed cycle for operating various components that may be connected across the terminals L1 and 1 of the timer.

At the end of the preset time cycle the holding contacts 246c are opened, thus deenergizing the motor 246a and the clutch solenoid 246b and discontinuing the time cycle. At this time, the load contacts 246d are also opened, thus disconnecting any load which is connected across the terminals 1 and L1 or ground. The reset contacts 246e which are normally open during the time cycle are momentarily closed at the end of the cycle, thus momentarily supplying current to the terminal 2 which current can be utilized for energizing another holding circuit or starting the time cycle on the next timer. As can be seen from the circuit diagram in FIG. 12, the terminal 2 of timer 246 is connected to terminal A of timer 248 and terminal 2 of timer 248 is connected to terminal A of the next timer and so on down the line so that as timer 246 finishes its time cycle the timer 248 will start on its time cycle and so on down the line until the last timer 254 has completed its time cycle and all the timers are then disconnected and ready to start new cycles.

The terminal 244b is connected in series with a starting push button 256 which is normally open. When the push button 256 is pushed by the operator, current flows through the push button to a start terminal 258 which is connected to terminal A of the timer 246 to a coil energizing terminal $T_1$ of a normally open relay R-5, and to the advance terminal of a double acting solenoid 260 controlling an air valve 262 (FIG. 11) which controls the air flow to the main cylinder 84 of the machine.

The relay R-5 is one of five identical normally open relays R-1 through R-5 which are housed in the electrical box 242. Each of these relays R-1 through R-5 is provided with four terminals $T_1$, $T_2$, $T_3$ and $T_4$. The actuating coils of the relays are connected across the terminals $T_1$ and $T_2$ and the terminals $T_3$ and $T_4$ are contact terminals. Upon energizing the actuating coil of the relays, a plunger is actuated which connects the terminals $T_3$ and $T_4$ together. It will be noted that the terminals $T_2$ of all the relays are connected to ground and that the terminals $T_1$ and $T_3$ are connected by a jumper so that if line current is applied to the terminal $T_1$ the relay will close and line current is then available at $T_4$ of the relay for operating various electrical components. If line current is disconnected from the terminal $T_1$ of the relays, the contacts will reopen and the terminal $T_4$ will be deenergized. The terminals $T_4$ of relays R-4 and R-5 are connected together by a jumper and are connected to the close terminal of a double acting solenoid 263 which actuates the valve 162 controlling the air cylinder 160, so that as line current is supplied to the terminal $T_1$ of either relay R-4 or R-5, the air cylinder 160 will be actuated to close the sprue 144 in the cope 16 preventing beads from entering or leaving the mold through the sprue as previously described. Terminal $T_4$ of relay R-3 is connected to the open terminal of the solenoid 263 so that as line current is applied to terminal $T_1$ of this relay, the air cylinder 160 will be actuated to open the sprue 144.

Terminals $T_4$ of the relays R-1 and R-2 are connected by a jumper and are also connected to the open terminal of a steam control solenoid 264 which actuates an air control valve 266 controlling an auxiliary air cylinder 268 which opens the steam valve 206 to admit steam into the mold chests 30 and 30a. Since the valve 206 is subject to high pressure, it is economically desirable to utilize a ball type valve and control it by means of the auxiliary air cylinder 268 rather than to control it directly by a large high power solenoid which would be required, solenoids of this size being relatively more expensive than the means utilized.

Thus, if the terminal $T_1$ of either relay R-1 or R-2 is energized, the steam valve 206 will be opened to admit steam into the mold chests 30 and 30a of the machine. The air control valve 266 is connected so that the steam valve 206 remains closed unless the solenoid 264 is energized.

When the start push button 256 is pushed and released by the operator of the machine, the start terminal 258 is momentarily energized with line current which momentarily energizes the advance terminals of the solenoid 260 causing the drag 18 to move into contact with the cope 16 and lock as previously described. The air valve 262 remains in the advance position and continually directs air pressure against the advance side of the cylinder 84 even after the operator's hand leaves the push button 256 allowing the start terminal to be deenergized. The momentary starting current also energizes the coil of relay R-5 causing the contacts to be momentarily closed, thus energizing the terminal $T_4$ of this relay. Terminal $T_4$ of relay R-5, being connected to the close terminal of the charge solenoid 263, causes the close coil to be momentarily energized, thus closing the sprue 144 as previously described. The solenoid 263 remains in this position directing air pressure through the valve 162 to the close side of the charge cylinder 160 even after the start terminal 258 is deenergized and the contacts of the relay R-5 are opened thereby.

The start terminal is also connected to terminal A of the preheat and lock timer 246 and the momentary starting current starts this timer into operation as described before. Terminal 1 of this timer is energized during the operation of the timer and is connected to light up an amber pilot light 270 which is located on the face of an electrical box 242 and indicates that the timer 246 is in operation. Terminal 1 of the timer 246 is also connected to terminal $T_1$ of relay R-2 causing its contacts to be closed while the timer 246 is in operation. The terminal $T_4$ of the relay R-2 is thus energized and, being connected to the open terminal of the steam solenoid 264, causes the control valve 266 to be actuated to direct air pressure to the open side of the auxiliary cylinder 268 which opens the steam valve 206 admitting steam to mold chests 30 and 30a to preheat the cope 16 and drag 18 as they are moving to close and lock.

The time interval during which the timer 246 is in operation can be set by the operator of the machine and consequently the temperature to which the molds are preheated can be readily controlled. It is also to be understood that the speed at which the main cylinder 84 is actuated is independent of the time of the preheat phase and can be adjusted as desired by making an adjustment on the air control valve 266 to control the rate of flow of air to the cylinder 84 through the valve 266.

The timer 246 is always set for a slightly longer period than it takes the mold to close and lock, otherwise the mold filling phase might begin before the mold was closed and locked.

As was previously mentioned, when the tube 96 is moving toward the outer face of the center bracing section 48 of the movable platen 46, a cam 232 engages the normally open micro-switch 230 for a short period of time before locking is completed. One terminal of the micro-switch 230 is connected to one terminal of the solenoid air valve 228 which controls the air flow to the air manifolds 214. The other terminal of the solenoid air valve 228 is connected to ground and the other terminal of the micro-switch 230 is connected to the terminal 244a of the on-off switch 244a. During the time the cam 232 is engaging the micro-switch 230 just before the mold locking is completed, the micro-switch is closed energizing the solenoid air valve 228 causing it to open and admit air pressure to the manifolds 184 to blow out any condensate that may have formed in the molds during the first stages of the preheating phase. As the cam 232 moves on past the micro-switch 230, the circuit is deenergized and the valve 228 automatically returns to the closed position shutting off the air blast before the mold is completely locked.

As the tube 96 comes in contact with the outer face of the center bracing section 48 of the movable platen 46 completing the locking of the locking dogs 114a, the cam 134 on the tube 96 closes the normally open micro-switch 132. The micro-switch 132 has one terminal connected to one of the terminals of the solenoid controlled guillotine air valve 130. The other terminal of the solenoid valve 130 is connected to ground and the other terminal of the micro-switch 132 is connected to the terminal 244a of the on-off switch 244. While the cam 134 is engaged with the micro-switch air pressure is directed to the lock side guillotine air cylinder 126 causing the guillotine 122 downward to lock the rods 120 completing the final locking of the mold. Later on during the unlock and eject phase, when the mold starts unlocking and the cam 134 moves out of engagement with the micro-switch 132 the circuit is opened and the solenoid air valve 130 is deenergized and the guillotine 132 returns to its upper position completing the unlocking of the rods 120 and allowing the drag 18 to move outwardly away from the cope 16.

Returning to the timer 246, as it finishes its time cycle, line current is disconnected from the terminal 1 thereof when the contacts 246c open at the end of the preset time period.

Thus, the amber pilot light 270 goes out and the relay R–2 is deenergized opening its contacts and deenergizing the steam solenoid 264. When the solenoid 264 is deenergized, the control valve 266 actuates the auxiliary cylinder 268 which shuts off the steam valve 206 stopping the flow of steam to the mold chests 30 and 30a and completing the preheat phase of operation.

At the end of the time interval set on the timer 246 the contacts 246e therein momentarily close and then open. Since the contacts 246e are connected across the terminals L2 and 2 of the timer 246 and since terminal 2 is connected to terminal A of the timer 248 which controls the mold filling system 24, a momentary current is supplied to start the timer 248 on its time cycle. The operation of timer 248 has been previously described and is similar to the operation of the timer 246.

Terminal 1 of the timer 248 is connected to a blue pilot light 272 which is mounted on the face of the electrical box 242 and lights up during the operation of the timer 248 indicating it is in operation. Terminal 1 of this timer is also connected to the terminal $T_1$ of relay R–3 energizing this relay and closing its contacts to energize the terminal $T_4$ of the relay. Terminal $T_4$ of relay R–3 is connected to the open terminal of the charge cylinder solenoid 263 which actuates the air cylinder 160 to open the sprue 144 and allow the molds to fill with beads. When the timer 248 completes its time cycle when the mold is completely filled, the contacts 248c and 248d are opened and the contacts 248e are momentarily closed and then opened. Since the contacts 248e are connected across the terminals 4 and 2 of the timer 248 and the terminal 2 is connected to the terminal A in the welding and heat timer 250 a momentary current is supplied to the timer 250 to start it on its time cycle.

The terminal 2 of the timer 250 is connected to a red pilot light 274 located on the face of the electrical box 242 which lights up indicating timer 250 is on its time cycle and the machine is operating in the weld and heat phase. Terminal 2 is also connected to a close terminal of a drain valve solenoid 276 operatively connected to an air valve 278 controlling an auxiliary air cylinder 280 which opens and closes the drain valve 196. The valve 196 is a ball valve and is operated by the air cylinder 280 in a similar manner to the steam valve 206. The air valve 278 is normally positioned to direct air pressure into the cylinder 280 in a manner so as to keep the drain valve 196 in the open position. When the timer 250 is operating and the solenoid 276 is energized, the air valve 278 directs air to the auxiliary air cylinder 280 so as to close the drain valve 196 and when the solenoid 276 is deenergized the valve 196 returns to the open position.

Terminal 1 of timer 250 is also connected to terminal $T_1$ of the relay R–1 and when the timer 250 is operating, the coil of this relay is energized closing the relay contacts and energizing terminal $T_4$ of the relay. The terminal $T_4$ of the relay R–1 is connected to the open terminal of the steam solenoid 264 causing steam to enter the mold chests 30 and 30a in order to expand the beads in the mold and weld them into a homogeneous mass.

Terminal 1 of the timer 250 is also connected to terminal $T_1$ of the relay R–4 and when the timer 250 is operating, the coil in this relay is energized and closes the relay contacts thus energizing terminal $T_4$ of the relay. The terminal $T_4$ of the relay R–4 is connected to the close terminal of the charge solenoid 263 in order to close the sprue 144 during the welding phase of operation and thus preventing the beads in the mold from expanding out the sprue 144 and clogging the mold injector 140 as previously discussed.

It will also be noted that during the welding phase the drain valve 196 is closed to prevent the loss of steam to the drain. As the beads in the mold are heated during this phase they expand and weld together forming a homogeneous mass which gradually closes the openings 164 in the mold walls. When this happens the steam begins to build up pressure within the mold chests 30 and 30a. The timer 250 is set to end its time cycle at this time to prevent this excessive buildup of pressure and as the timed period ends the steam flow is shut off and the drain valve is opened allowing the pressure to subside. It will also be noted that the duration of the welding phase is dependent upon the amount of volume in the mold cavities; it taking longer heating periods to heat and weld together the beads in a large cavity than in a small one. It has also been found that by the time the beads have become welded together sufficiently to cause the pressure to start building up in the mold chests 30 and 30a as described previously, the beads are then welded together in a homogeneous mass and no more heating is required.

When the weld and heat phase timer 250 finishes its time cycle, the dwell timer 252 is started in operation. Terminal A of the dwell timer 252 is connected to terminal 2 of the weld timer 250 so that as the contacts 250e momentarily close and then open at the end of the weld and heat phase, energy is momentarily supplied to terminal A of the dwell timer 252 which begins its time cycle. The only connection to terminal 1 of the dwell timer is a white pilot light 282 also located on the face of the electric box 242. The white pilot light 282 is lighted during operation of the dwell timer 252 to show that the timer is in operation. The purpose of the dwell timer 252 is to provide an adjustable time interval between the heat and weld phase of the machine and the cooling phase. It has been found that if rapid cooling of the beads is initiated immediately after the heat and weld phase, the beads will sometimes collapse because the chemical process taking place within the beads is not completely at equilibrium and may be reversed by a sudden cooling. Thus, during the dwell phase the beads are allowed to cool slowly in the mold until equilibrium is established in the chemical reaction within the beads and then the cooling phase can be initiated.

When the dwell timer 252 finishes its time cycle, the contacts 252e close momentarily and then open. Since these contacts are connected across the terminals 4 and 2 of timer 252 and terminal 2 of the timer 252 is connected to terminal A of the cooling timer 254, current is momentarily delivered to the timer 254 to start its time cycle. As the timer 254 begins its timing phase, current is supplied to terminal 1 of the timer which is connected to a green pilot light 284. The pilot light 284 is also located on the face of the electrical box 242 and lights up to indicate the cooling phase timer 254 is in operation.

Terminal 1 of the timer 254 is connected to an open terminal of a water valve solenoid 286 which has its other terminal grounded to complete the circuit. The solenoid 286 operates an air valve 288 which controls an auxiliary air cylinder 290 connected to open and close the water valve 210. The water valve 210 is also a ball valve similar to the steam valve 206 and drain valve 196. When the solenoid 286 is energized by the timer 254 the air valve 288 is operated to admit air pressure to the auxiliary air cylinder 290 causing the valve 210 to open and admit cooling water to the mold. When the timer 254 times out the solenoid 286 is deenergized and the water valve 210 returns to a closed position. It is to be noted that during the cooling phase the drain valve 196 is open allowing water which passes over the rear surfaces of the mold in the mold chests 30 and 30a to pass on to the drain and to prevent a buildup of high water pressure in the mold chests.

At the end of the cooling phase, the contacts 254e across the terminals 2 and 4 of the timer 254 are momentarily closed and then opened. Terminal 2 of the timer 254 is connected to the reverse terminal of the solenoid 260 causing air pressure to be directed into the reverse side of the main cylinder 84 to unlock and move the drag 18 away from the cope 16.

It should be remembered that, as the tube 96 moves away from the outer face of the center bracing section 48 of the movable platen 46 during unlocking of the mold, the cam 134 moves away from the micro-switch 132 opening the switch and causing the guillotine 122 to be moved upwardly to unlock the rods 120. Also, as the cam 232 momentarily engages the micro-switch 230 during this movement of the tube 96 away from the center bracing section 48 of the movable platen 46, the micro-switch 230 is momentarily closed causing an ejecting air blast to be initiated for a short period of time in order to aid ejection of the finished molded products from the cavities as previously described.

All the timers are now disconnected and the complete cycle just described can be repeated by pushing the start push button 256.

As a safety feature the safety push button 245 is provided within easy reach of an operator by mounting it on the bracing structure 34 of the platen 32. The button is red in color and is positioned slightly inside of the outer edge of the platen 32 to prevent inadvertent actuation by an operator.

The safety push button 245 is provided with a pair of normally closed contacts 245a and 245b and a pair of normally open contacts 245c and 245d. The contact 245a is connected to the terminal 244a of the on-off switch 244 and the contacts 245b is connected to the line terminals L-2 of all the timers to supply the line current to them. The terminal 245c is also connected to the terminal 244a of the on-off switch 244 and the terminal 245d is connected to the reverse terminal of the main cylinder solenoid 260.

Should the molds start to close when a person's hand or body, or other obstruction is between the molds or for any other reason it is desired to instantly unlock and separate the molds, the safety push button 245 is actuated. When this is done the contact between the terminals 245a and 245b is momentarily broken which cuts off the current to the line terminals L-2 of all the timers and the operation of the timer which happens to be operating is stopped. Any flow of steam or water to the molds is consequently stopped immediately and the drain is opened.

When the safety push button is depressed, contact will also be made momentarily between the terminals 245c and 245d, thus energizing the reverse terminal of the solenoid 260 and causing the mold to unlock and open. When the safety push button is released the circuit is again ready to start a completely new cycle of operation which can be initiated by depressing the start button 256 as described previously.

The manual ejection system previously described is wired as follows: One terminal of the normally open switch 240 is connected to the terminal 244a of the on-off switch 244. The other terminal of the switch 240 is connected to the close terminal of the drain valve solenoid 276. When the handle of the manual air valve 238 is actuated to admit air to the mold chest 30, the mechanically interconnected switch 240 is closed, thus energizing the solenoid 276 and closing the drain valve 196 so that air pressure will also be directed to the mold chest 30a as well as the mold chest 30. When the valve handle of the manual air valve 238 is released the valve returns to a closed position shutting off the air flow and the switch 240 opens allowing the drain valve 196 to return to the open position.

In order to adequately provide for lubrication of the various air cylinders of the machine 10, oilers 298 and filters 300 are placed in the air lines which feed the various cylinders as can be seen in FIG. 11. The air pressure lines feeding the mold filling system 22 and the mold ejection system 26 are not provided with oiler as it is undesirable to have oil mixed with the beads in the mold as it might prevent proper expanding and welding of the beads. Further, it is to be understood that while the mold ejection system 26 functions to eject the finished products from the mold cavities it also serves another purpose in that it provides for air pressure to be delivered to the mold cavities just prior to the closing of the mold in order to remove any condensate therein which may have accumulated during the prior fast preheat phase.

The following is a tabular summary of the automatic operation of the machine for a better understanding of the operation.

PHASE I—PREHEAT AND LOCK

*Timer 246 in Operation*

Main cylinder air valve 206—OPEN to ADVANCE side of cylinder 84
Steam valve 206—OPEN to admit preheat steam
Drain valve 196—OPEN
Water valve 210—CLOSED
Mold injector 140—CLOSED to prevent beads from flowing into open mold
Air ejector valve 228—CLOSED—opens momentarily just prior to closing of the molds
Guillotine lock cylinder 160—UNLOCKED—moves to LOCK position after mold closes

PHASE II—CHARGE

*Timer 248 in Operation*

Main cylinder air valve 262—OPEN to ADVANCE side of cylinder 84
Steam valve 206—CLOSED
Drain valve 196—OPEN
Water valve 210—CLOSED
Mold injector 140—OPEN to fill mold
Air ejector valve 228—CLOSED
Guillotine lock cylinder 160—LOCKED

PHASE III—WELD AND HEAT

*Timer 250 in Operation*

Main cylinder air valve 262—OPEN to ADVANCE side of cylinder 84
Steam valve 206—OPEN to admit heating steam
Drain valve 196—CLOSED
Water valve 210—CLOSED
Mold injector 140—CLOSED
Air ejector valve 228—CLOSED
Guillotine lock cylinder 160—LOCKED

PHASE IV—DWELL

*Timer 252 in Operation*

Main cylinder air valve 262—OPEN to ADVANCE side of cylinder 84
Steam valve 206—CLOSED
Drain valve 196—OPEN
Water valve 210—CLOSED
Mold injector 140—CLOSED
Air ejector valve 228—CLOSED
Guillotine lock cylinder 160—LOCKED

PHASE V—WATER COOL

*Timer 254 in Operation*

Main cylinder air valve 262—OPEN to ADVANCE side of cylinder 84
Steam valve 206—CLOSED
Drain valve 196—OPEN
Water valve 210—OPEN
Mold injector 140—CLOSED
Air ejector valve 228—CLOSED
Guillotine lock cylinder 160—LOCKED

PHASE VI—UNLOCK AND EJECT

*No Timer in Operation*

Main cylinder air valve 262—OPEN to REVERSE side of cylinder 84
Steam valve 206—CLOSED
Drain valve 196—OPEN
Water valve 210—CLOSED
Mold injector 140—CLOSED
Air ejector valve 228—CLOSED—Open momentarily prior to complete unlocking of mold
Guillotine lock cylinder 160—UNLOCKED It will be appreciated from the foregoing description that the molding machine of the present invention provides for rapid and fully automatic molding of high quality products from polystyrene. The machine is relatively light and compact and can easily and quickly be adjusted to accommodate a variety of different molds and can operate simultaneously with different molds in each section.

While the present invention has been described in connection with particular embodiments of the invention, it will be understood that various modifications may be made by those skilled in the art. It is intended in the appended claims to cover all such modifications as fall within the true spirit and scope of this invention.

What is claimed as new and is desired to be secured by Letters Patent of the United States is:

1. Apparatus for producing molded products such as of polystyrene and the like formed in a mold having a cope and a drag, said apparatus comprising a fixed first platen for supporting the cope of the mold, second platen fixedly spaced from said first platen, a plurality of rods interconnecting said platens, a third platen intermediate said first and second platens for supporting the drag of the mold in movable confronting relation to a cope, means operatively associated with said second and third platens for moving said third platen toward and away from the first-mentioned platen, stop means provided on said rods intermediate said second and third platens when said mold is closed, and means operatively associated with said third platen for engaging said stop means to lock said third platen in a mold-closed position.

2. Apparatus for producing molded products such as of polystyrene and the like formed in a mold having a cope and a drag, said apparatus comprising a fixed first platen for supporting the cope of the mold, a second platen fixedly spaced from said first platen, a plurality of rods adjustably interconnecting said platens, a third platen intermediate said first and second platens for supporting the drag of the mold in movable confronting relation to a cope, means operatively associated with said second and third platens for moving said third platen toward and away from the first-mentioned platen, adjustable stop means provided on said rods intermediate said second and third platens when said mold is closed, and means operatively associated with said third platen for engaging said stop means to lock said third platen in a mold-closed position.

3. Apparatus for producing molded products such as of polystyrene and the like formed in a mold having a cope and a drag, said apparatus comprising a fixed first platen for supporting the cope of the mold, a second platen fixedly spaced from said first platen, a plurality of rods interconnecting said platens, a generally rectangular third platen intermediate said first and second platens for supporting the drag of the mold in movable confronting relation to a cope, means operatively associated with said second and third platens for moving said third platen toward and away from the first-mentioned platen, stop means provided on said rods intermediate said second and third platens when said mold is closed, and means bearing on the corners of said third platen for engaging said stop means to lock said third platen in a mold-closed position.

4. Apparatus for producing molded products such as of polystyrene and the like formed in a mold having a cope and a drag, said apparatus comprising a fixed first platen for supporting the cope of a mold, a second platen spaced from said first platen, a plurality of stress members adjustably interconnecting said platens and each including a threaded stress rod and a plurality of nuts threaded on said rod for securing said rod to said platens, additional nuts threaded on said rods intermediate said platens forming locking members on said rods adjustably positionable intermediate said second and third platens when said mold is closed, a third platen intermediate said first and second platens for supporting the drag of the mold in movable confronting relation to a cope, air actuated cylinder mounted on said second platen and including a movable piston rod extending toward said third platen, a crosshead carried by said piston rod and including a hollow tube provided with diametrically opposed axially elongated slots, a guide rod extending from said third platen slidably received in said tube, said guide rod being provided with a crosspin slidably received in said slots, a plurality of locking arms pivotally connected to said crosshead and extending radially toward said locking members, said locking arms being provided with locking dogs slidably bearing against a surface of said third platen for slidable and pivotal movement relative thereto so that pivoting of said locking arms moves said locking dogs into and out of engaging alignment with said locking members and into clamping relation between said third platen and said locking members, means biasing said locking arms against said third platen, and means biasing said crosshead away from said third platen.

5. Apparatus for producing molded products such as of polystyrene and the like formed in a mold having a cope and a drag, said apparatus comprising a fixed first platen for supporting the cope of the mold, a second platen spaced from said first platen, a plurality of stress members adjustably interconnecting said platens and each including a threaded stress rod and a plurality of nuts threaded on said rod for securing said rod to said platens, additional nuts threaded on said rods intermediate said platens forming locking members on said rods, a third platen intermediate said first and second platens for supporting the drag of the mold in movable confronting relation to a cope, a fluid actuated cylinder mounted on said second platen and including a movable piston rod extending toward said third platen, a crosshead carried by said piston rod, a lost motion connection between said crosshead and said third platen, a plurality of locking arms pivotally connected to said crosshead and extending toward said locking members, said locking arms being provided with locking dogs slidably bearing against a surface of said third platen for slidable and pivotal movement relative thereto so that pivoting of said locking arms moves said locking dogs into and out of engaging alignment with said locking members and into clamping relation between said third platen and said locking members, means biasing said locking arms out of said engaging alignment with said locking members, and means biasing said crosshead away from said third platen.

6. Apparatus for producing molded products such as of polystyrene and the like formed in a mold having a cope and a drag, said apparatus comprising a fixed first platen for supporting the cope of the mold, a second platen spaced from said first platen, four rectangularly arranged stress members adjustably interconnecting said platens and each including a threaded stress rod and a plurality of nuts threaded on said rod, additional nuts threaded on said rods intermediate said platens forming locking members on said rods, a generally rectangular platen intermediate said first and second platens and concentric with said stress members for supporting the drag of the mold in movable confronting relation to the cope, a fluid actuated cylinder mounted by said second platen and including a movable piston rod extending toward said third platen, a crosshead carried by said piston rod and including a hollow tube provided with diametrically opposed axially elongated slots, a guide rod extending from said third platen slidably received in said tube, said guide rod being provided with a crosspin slidably received in said slots to provide a lost motion type of conection between said piston rod and said third platen, four locking arms aligned with the respective corners of said third platen and with said locking members and having one end pivotally connected to said crosshead, said locking arms each being provided with a locking dog at its other end slidably bearing against a corner surface of said third platen for slidable and pivotal movement relative thereto so that movement of said crosshead relative to said third platen pivots said locking arms to move said locking dogs into and out of engaging alignment with said locking members and additionally pivots said locking dogs into clamping relation between the corners of said third platen and said locking members, means biasing said locking arms against third platen, and means biasing said crosshead away from said third platen.

References Cited in the file of this patent

UNITED STATES PATENTS

| | | |
|---|---|---|
| 2,371,547 | Rosenlund et al. | Mar. 13, 1945 |
| 2,492,259 | Beuscher | Dec. 27, 1949 |
| 2,586,896 | Wittlin | Feb. 26, 1952 |
| 2,744,304 | Kaul | May 8, 1956 |
| 2,781,546 | Hallenbeck et al. | Feb. 19, 1957 |
| 2,916,795 | Henderson | Dec. 15, 1959 |
| 2,988,778 | Chaze et al. | June 20, 1961 |
| 3,043,627 | Torjusen | June 10, 1962 |